United States Patent [19]

Onishi et al.

[11] Patent Number: 5,039,727

[45] Date of Patent: Aug. 13, 1991

[54] POLYBUTYLENE TEREPHTHALATE MOULDING COMPOSITIONS WITH AN IMPROVED FLOWABILITY

[75] Inventors: Yasuhiko Onishi, Seto; Yoshinobu Kubo, Yokkaichi; Takao Nozaki, Tsu, all of Japan

[73] Assignee: Sumitomo Wiring Systems, Ltd., Japan

[21] Appl. No.: 418,881

[22] Filed: Oct. 10, 1989

[30] Foreign Application Priority Data

Oct. 7, 1988 [JP] Japan .................. 63-254544

[51] Int. Cl.$^5$ .................. C08L 67/02; C08L 91/06
[52] U.S. Cl. .................. 524/277; 524/539; 525/444
[58] Field of Search .................. 524/277, 539; 525/444

[56] References Cited

U.S. PATENT DOCUMENTS

| | | | |
|---|---|---|---|
| 4,132,707 | 1/1979 | Horman | 525/444 |
| 4,140,670 | 2/1979 | Charles et al. | 524/539 |
| 4,315,882 | 2/1982 | Hiratsuka et al. | 525/444 |
| 4,593,077 | 6/1986 | Borman et al. | 525/444 |

FOREIGN PATENT DOCUMENTS

| | | | |
|---|---|---|---|
| 1-101364 | 4/1989 | Japan | 524/277 |
| 1-103654 | 4/1989 | Japan | 524/277 |

*Primary Examiner*—Lewis T. Jacobs
*Attorney, Agent, or Firm*—Jordan B. Bierman

[57] ABSTRACT

Thermoplastic polyester compositions comprising at least two groups of polybutylene terephthalate with substantially different intrinsic viscosity values and conventional additives for molding having an improved thermal flow capability under molding conditions expressed in such indices as heat flow (m cal/sec), enthalphy change $\Delta Hm$(Joule/gr) at the solidification of fused polymer, crystalline fraction (Xc), and the time of growth to (sec) of the primary nuclei of embryonic crystalline. The polymer compositions of the present invention result in a larger size of crystalline than the case of independent, single polymer and this enables to carry out injection moulding at about 20 degrees lower cylinder temperature than usual molding practice without sacrificing mechanical and thermal properties of the product.

11 Claims, 3 Drawing Sheets

POLYBUTYLENE TEREPHTHALATE MOULDING COMPOSITIONS WITH AN IMPROVED FLOWABILITY

FIELD OF THE INVENTION

The moulding compositions of the present invention are especially suitable for manufacture of precision moulded products where polybutylene terephthalate is used due to excellent thermal and dimensional stability which are required in automotive and electronic industries. The inherent high flowability of the polymer compositions of the present invention under moulding conditions is most typically demonstrated in the manufacture of electrical connector housings, fuse boxes and relays and switches.

STATE OF THE ART

U.S. Pat. No. 4,749,755 discloses thermoplastic polyester compositions of low melt viscosity consisting of [I] polyalkylene terephthalates, [II] small amounts of polycarbonate and optionally [III] customary additives. It is also mentioned that some behavior in hot air aging (dimensional stability at elevated temperatures) is improved by the said invention. The patent described the flowability in the melt as being improved markedly (up to about 45%) by the addition of relatively small weight fractions of polycarbonate [II] (0.5 to 15% by weight of polycarbonate) without significant adverse effects on the physical properties of moulded products.

The rate of crystallization of aromatic polyester was measured by Gilbert et al utilizing differential thermal analyzers and they concluded that the rate of crystallization was strongly dependent upon their aromatic structures. (polymer Vol. 13, 327–332,1972) Gutzow et al studied the induction period of polyethylene terephthalate and found that the presence was strongly influenced by the period of small metallic particles. (Journal of Polymer Sci. 1155, Vol. 16,1978)

SUMMARY OF THE INVENTION

Polybutylene terephthalate (hereafter described as PBT) is one of the most widely used polyalkylene terephthalates and is finding new applications in the field of precision moulding products such as electrical connector housing, relay, and fuse boxes for automobile industry. The desirable inherent characteristics of PBT are good thermal distortion, dimensional stability, impact strength and resistance to conventional chemicals and solvents.

Recent developments of micro-electronics also urges wiring harness for automotive use to incorporate large numbers of insulated wires in a set of harness and accordingly multi-connecting, reliable and compact light weight connector housing are required. In addition, latching means for connection proof and water-repellency for protecting electrical terminals in a housing have become essential to ensure reliability of connections.

PBT moulding compositions are required to obtain thinwalled, light weight electrical housings with reasonable price and this can only be accomplished by selecting a moulding composition with balanced properties of a) high flowability b) easy release from the mould surface and c) good thermal and mechanical properties of the product.

To achieve the said described balance of properties, polybutylene terephthalate moulding compounds including relatively low molecular weight PBT resins are used and this generally provides a moulded product with an inferior degree of mechanical properties such as impact strength and tensile strength. As described previously, U.S. Pat. No. 4,749,755 discloses an impact-resistant polyester composition of low melt viscosity by preparing mixtures of polyalkylene terephthalate and aliphatic polycarbonates such as polyhexamethylene carbonates with various end groups, OH numbers, and molar masses. It is described that the flowability in the melt is also improved by the invention of Buysch et al.

OBJECTS OF THE INVENTION

It is an object of the invention to provide a PBT moulding composition with an excellent balance of thermal and mechanical properties and a high degree of flowability in the melt which provides housing manufacturers with an advantageous moulding composition at a reasonable manufacturing cost.

This and other objects and advantages of the invention will become obvious from the following detailed description.

The above disadvantages of polybutylene terephthalate are solved by using at least two polybutylene terephthalate resins having different intrinsic viscosity values such as 0.70 to 0.92 for resin(A) and 0.93 to 1.40 for resin(B) expressed in dl/gr specifically. The compositions of PBT resins of the present invention are explained in detail in the Figures and Tables.

PBT resins are generally prepared by polycondensation of aliphatic diols and dimethyl terephthalate (DMT). Although 1,4-butane diol is most widely used among diols, ethylene glycol and 1,3-propane diols can be used. Other dibasic carboxylic acid esters can be used with DMT and vice versa. As it is inherent to a compound with ester linkage, PBT is also liable to be hydrolyzed in the presence of water. It is understood, therefore, that hydrolysis of PBT resins and re-condensation of polymers may occur resulting in a polymer with a higher degree of condensation and with different molecular weight distribution.

The hydrolysis-polycondensation can be schematically expressed in equation (1)

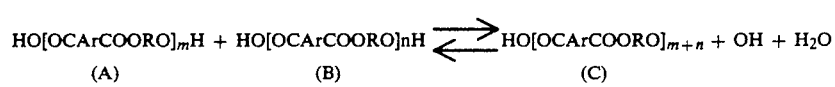

$$HO[OCArCOORO]_mH + HO[OCArCOORO]nH \rightleftharpoons HO[OCArCOORO]_{m+n} + OH + H_2O$$

(A)        (B)        (C)

From the above equation, molecular structure of the PBT resin (C) is affected by the presence of water in original resins (A) and (B) and this influences the degree of condensation of PBT under process or molecular weight distribution of the total composit system containing (A) and (B).

Another important reaction which will take place under the melt is ester exchange between polymer (A) and polymer (B) which leads to a polymer composition with another molar distribution. The second schematic reaction is expressed in equation (2).

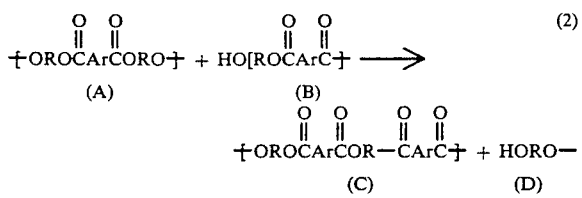

According to equation (2), number average molecular weight Mn is unchanged, while the weight average molecular weight Mw increases and the ratio of Mw/Mn reaches a specific value under given conditions. In an ideally progressed stage of reaction under the melt, it is known that Mw/Mn is approximately 2 in polyalkylene terephthalate polymers having homogeneous molar structure.

When two polymer groups of PBT(A) and PBT(B) with different molecular weight distributions are included in a composition and are subject to moulding conditions, they show one molecular weight distribution as illustrated below and the ratio of Mw to Mn is around 2 as expressed in equation (3)

$$Mw/Mn = 2 \tag{3}$$

The second basic principle under consideration is the crystallization rate and the size of crystal. Crystallization of PBT in a mould with chilling means is regarded as an isothermal phenomenon and the degree of crystallization X is expressed by Avrami's equation (4)

$$X = 1 - \exp(-Kt^n) \tag{4}$$

Where X is the degree of crystallization, K is the overall kinetic of crystallization, t is time and n is Avrami's number Overall kinetics of crystallization K in the equation (4) is expressed as follows:

$$K = (\pi/3)IG^3 \tag{5}$$

Where I is the rate of growth of the crystallization nucleus and G is the radial rate of crystal growth. Under rapidly enforced chilling conditions in a moulding practice under discussion, PBT is proven to provide spherulite and therefore G is a constant and I has also a specific value throughout throughout the composition even though the growth rate becomes somewhat higher by the presence of fillers than that without them.

When the spherulite of PBT grows homogeneously throughout the compositions in the mould, the value of n in equation (4) is 4 and the degree of crystallization X is governed by the product of rate growth of nucleus, radial rate of crystal growth, and fourth power of temperature.

Close observation of solidification of PBT and PBT compositions for moulding indicates that solidification time ts is given by the following equation:

$$ts = to + tc \tag{6}$$

Where to is an induction period and tc is the time for growth of crystallization. It should be mentioned that the overall kinetics of crystallization K in equation (5) only deal with tc in equation (6) and the induction time to is regarded as an independently required time. In other words, the time of primary nucleation during which growth of the primary nuclei takes place becomes an important factor. In any case in the experiments using PBT (A) and (B), and their combination (C), the induction times to were about three times larger than tc.

The rate of growth of primary crystallization J is expressed as in equation (7)

$$J = \Omega \exp(-\Delta Ge/RT) \tag{7}$$

where $\Delta GE$ is the energy of conversion from cluster under temperature depression to an embryonic crystalline, R is the universal gas constant, T is temperature of the phase K degree, $\Delta GE$ is expressed as a function of surface energy of crystalline $\delta$ by equation (8)

$$\Delta Ge \alpha \delta^3 (\Delta T \cdot T)^{-2} \tag{8}$$

where T is temperature of the phase in °K and $\Delta T$ is temperature depression from melt temperature in °K The diameter of spheric embryonic crystalline r is given as follows:

$$-r \alpha \delta \Delta T \cdot T^{-1} \tag{9}$$

From equations (7), (8) and (9), it is deduced that the rate of growth of primary crystallization J is retarded when the surface energy $\delta$ of crystalline under embryonic state becomes large.

It is understood that the radius of crystalline tends to become large under the same conditions and thus large spherulites resulted when PBT polymers with different molecular weight distribution as indicated by different values of intrinsic viscosity are present in the melt and when random structures of polymer takes place by the previously described factors such as hydrolysis/polycondensation and ester exchange reaction result in an increase of surface energy $\delta$ of the resulting spherulite.

Transition of two molecular weight distribution of two PBT polymers into one, common fraction in the melt is illustrated in FIG. 1.

PREFERRED EMBODIMENTS OF THE INVENTION

The delayed solidification and large size of crystalline caused by an increase of surface energy of embryonic crystalline nucleus is now achieved through combination of PBT resins with substantially different values of intrinsic viscosity [η]. The preferred embodiments of the present invention are described in detail.

[1] Induction time (to) and crystallization time (tc)

[1A] PBT polymer characteristics —Two PBT polymer samples [A] and [B] were used for the experiments. Polymer probe [A] and [B] had different intrinsic viscosity values of $[\eta]_A = 0.85$(dl/g) and $[\eta]_B = 0.92$(dl/g), respectively. They were both in a pelletized form and equal amounts in weight of the resins were throughly blended. The resulting blend polymer probes [C] was also used for the experiment.

The intrinsic viscosity of polymer probles [A] and [B] were both measured at 30° C. in a mixture of tetrachlorethane and phenol in 40/60 parts by weight. Time for crystallization of polymer probes [A], [B] and [C] were observed using a polarizing microscope (Nikon Microphotometer Type FX of Nippon Kogaku Corp. Japan) with a hot stage (Mettler FP-80, FP-82). Small portions of each polymer probe were taken and placed on a slide glass and covered with a piece of covering glass.

The polymer probe was transferred into the hot stage and was heated until the temperature of the hot stage reached 270° C. and was maintained for about 3 minutes. After the polymer probe under heat was throughly melted, the polymer probe was quickly transferred onto another hot stage which had been warmed to 60° C. and changes in the amount of light which passed through the polymer probe were observed. The induction time or initiation time (to) and crystallization time (tc) are summarized in Table 1. It was observed that improved flowability of the molten polymer during the process of the primary stage of crystallization was achieved by utilizing a polymer composition (C) instead of using (A) or (B) independently.

| PBT resins | $t_0$ | $t_{\frac{1}{2}}$ | tc |
|---|---|---|---|
| (A) | 5.10 | 0.75 | 1.73 |
| (B) | 5.30 | 0.95 | 2.13 |
| (C) | 6.17 | 0.88 | 1.97 |

Note:
(1) $t_0$ (sec): induction time for crystallization
(2) $t_{\frac{1}{2}}$ (sec): 50% crystallization time
(3) tc(sec): crystallization time It should be also mentioned that in all polymer probes of PBT, the induction time (to) was about three times longer than the crystallization time (tc) and that the overall period necessary for solidification of PBT polymer in the melt was determined by (to), not by (tc).

[IB] PBT Compositions for moulding purpose.

A practical composition of PBT resin for moulding purposes usually contains a releasing agent to provide easy release of the formed product from the surface of the mould. Typical releasing agents are mortan waxes, their salts, or their partially esterified homologs and their amount in a PBT moulding resin composition is usually from about 0.01 to about 2.0 percent by weight. Montanic acid is a given name for a mixture of aliphatic monocarboxylic acids of 26 to 32 carbon atoms.

The acid mixture is converted to its metallic salts by neutralization with oxides or hydroxides of metals which are found in the groups I, II and III of the periodic table. The partially esterified products of montanic acid and their metallic salts are obtained by reacting the acid with aliphatic diols such as ethylene glycol, 1,2 or 1,3-propanediols, or 1,3 or 1,4-butanediols so that the equivalent ratio of OH/COOH does not exceed 0.9. The resulting esters with free acid groups are neutralized as described in the case of acid salts to provide montanic acid ester salts of metals.

Two PBT polymer samples (A)p and (B)p were taken from production lot(A) and lot(B), respectively. The intrinsic viscosity of PBT polymer in lot(A) ranged from 0.70 to 0.92 (dl/g) measured at 30° C. in a mixture of 40/60 parts by weight of tetrachlorethane/phenol, while the intrinsic viscosity of the polymer in lot(B) ranged from 0.93 to 1.40 (dl/g) measured under the same conditions as in the case of lot(A). The polymer sample (C)p was a 50/50 weight mixture of polymer samples (A)p and (B)p and the fourth sample (D)p was a second mixture consisting of 70 parts by weight of (A)p and 30 parts by weight of (B)p.

To observe the effect of releasing agents, a sodium ester of montanic acid was selected and 0.3 parts by weight of the ester was added to the total compositions. The formulated composition was named (D)p. They were, for instance, composition(A)c which contained 99.7 parts by weight of polymer sample (A)p and 0.3 parts by weight of the release agent and the other three compositions of (B)c, (C)c, and (D)c were formulated in the same manner.

Compositions (A)c, (B)c, (C)c and (D)c were brought into the molten stage at 270° C. and both the induction time (to) and crystallization time (tc) were measured in the same manner as described previously by utilizing a polarizing microscopic method at 60° C. Additionally, photographs in FIG. 2 of the resulting spherulites were taken to measure their sizes. The results of the experiments were summarized in Table 2.

The differential scanning calorimetric analysis was carried out for the four PBT resins. (A)p and (B)p with two different ranges of intrinsic viscosity values of [$\eta\alpha$]. [$\eta\beta$] in equal weight amounts had the maximum heat flow point at 183.6° C. which was lowest among those for the remaining other compositions. The results are shown in FIG. 3.

TABLE 2

| Solidification Time and Size of PBT Moulding Compounds | | | | |
|---|---|---|---|---|
| Moulding Compositions | Time in seconds | | | |
| | $t_0$ | $t_{\frac{1}{2}}$ | tc | r |
| (A) c | 5.03 | 0.73 | 1.73 | 1 ~ 5 |
| (B) c | 4.87 | 0.35 | 0.88 | 1 ~ 5 |
| (C) c | 5.25 | 0.45 | 0.94 | 3 ~ 10 |
| (D) c | 5.08 | 0.42 | 0.88 | 1 ~ 5 |

Note:
(1) $t_0$ (sec): induction time for crystallization
(2) $t_{\frac{1}{2}}$ (sec): 50% crystallization time
(3) tc(sec): crystallization time
(4) r ($\mu$): Size of spherulite It was observed that longer induction times resulted for sample (C)c and (D)c than in the case of (A)c and (B)c where the PBT polymers were used individually. Polymer sample (B)p having a higher intrinsic viscosity value contributed to shorten the period of crystallization. The size distribution of spherulite was markedly raised in the case of (C)c where two polymer samples (A)p and (B)p were blended in equal weights of 50/50. It was concluded that the effect of other ingredients other than PBT resins on the flowability of the total composition was negligible if the amount of the ingredients were controlled.

In the foregoing example, polymer sample (A)p had an intrinsic viscosity ranging from 0.70 to 0.92 (dl/g) at 30° C. in 40/60 parts by weight mixture of tetrachlorethane phenol and the intrinsic viscosity range of polymer sample (B)p was 0.93 to 1.40 (dl/g) measured in the same manner. When the total amount of PBT resins were 100 parts by weight, the amount of polymer (A)p should not be more than 95 parts by weight and also should not be less than 5 parts by weight.

The most preferred fraction(fa) of polymer (A)p in the composition is:

$$10 < fa < 90 \qquad (10)$$

If the amount of polymer (A)p exceeds 95 parts by weight, the mechanical properties of moulded products are adversely affected when it it is less than 5 parts by weight. The flowability of the compositions in the melt is reduced.

Preparation of PBT moulding compositions was carried out according to the conventional method. For instance, PBT resins with different intrinsic viscosity values are commercially available. Those resins, release agents such as montan acid derivatives, heat stabilizers, lubricants, pigments, UV stabilizers, antioxidants and plascitizers such as butylamide of benzene sulfonic acid or 2-ethylhexylp-hydroxybenzoate were mixed together by suitable mixing equipment such as a Henshell Mixer or Tumbler and were fed to an injection machine with screws to provide a composite material in a pellet form.

Fillers are not essential for the PBT compositions of the invention but they may be selected from inorganic organic particles, or fibers can be used if the presence of such fillers does not provide some adverse effects in terms of flowability and rate of crystallization of the system. The PBT moulding compositions for automotive electrical connector houing are listed in Table 3 and Table 4.

Examples 1 to 5 are typical compositions for a precision PBT connector housing consisting of two types of PBT resins, a release agent, and a heat stabilizer. In Table 3, Examples 1, 4 and 5 are a combination of two PBT resins in substantially equal weight amounts and Example 2 is a 70/30 combination and Example 3 is a 80/20 blend. There are another five compositions for the purpose of evaluation of each of the ingredients, namely PBT resins with low and high molar distribution respectively (Example 6, 7 and 8), release agent (Example 9) and a filler (Example 10). Their formulations are listed in Table 4.

TABLE 3

Compositions of Example 1 ~ 5
(Parts by weight)
Weight Ratio

| Component | Grade | 1 | 2 | 3 | 4 | 5 |
|---|---|---|---|---|---|---|
| PBT resin | [b]-0.85 (A) | 50.0 | 70.0 | 80.0 | 49.7 | 50.0 |
|  | [b]-0.92 | — | — | — | — | — |
|  | [b]-1.00 (B) | 49.4 | 29.4 | — | 49.4 | 49.4 |
|  | [b]-1.15 | — | — | 19.4 | — | — |
| release agent | A | 0.3 | 0.3 | 0.3 | 0.6 | — |
|  | B | — | — | — | — | 0.3 |
| heat stabilizer | irganox | 0.3 | 0.3 | 0.3 | 0.3 | 0.3 |
| filler | talc | — | — | — | — | — |
| total | — | 100 | 100 | 100 | 100 | 100 |

TABLE 4

Compositions of Example 6-10
(Parts by weight)
Weight Ratio

| Component | Grade | 6 | 7 | 8 | 9 | 10 |
|---|---|---|---|---|---|---|
| PBT resin | [b]-0.85 (A) | 99.4 | — | — | 50.0 | 50.0 |
|  | [b]-0.92 | — | 99.4 | — | — | — |
|  | [b]-1.00 (B) | — | — | — | 49.7 | 49.7 |
|  | [b]-1.15 | — | — | 99.4 | — | — |
| release agent | A | 0.3 | 0.3 | 0.3 | — | 0.3 |
|  | B | — | — | — | — | — |
| heat stabilizer | irganox | 0.3 | 0.3 | 0.3 | 0.3 | 0.3 |
| filler | talc | — | — | — | — | 0.3 |
| total | — | 100 | 100 | 100 | 100 | 100 |

As described previously, the intrinsic viscosity [] was measured at 30° C. in a mixture of tetrachlorethane/phenol 40/60 (by weight ratio). Release agent A was the sodium salt of montan acid and release agent B was the calcium salt of a partial ester of montan acid. The filler used in Example 10 was talc powder and Irganox was the heat stabilizer which is manufactured by Ciba Geigy AG.

Preparative method of the PBT moulding compositions and moulding operations for test pieces and connector housings are not essential to the invention and it was carried out by conventional methods. In Example 1, the four ingredients were mixed together and fed to an extruder with an extrusion screw of 40 mm in diameter and melted homogeneously at 240° C. followed by pelletization.

An injection moulding using a Clause-Maphy apparatus of 3.5 ounces capacity was used to prepare the test pieces for evaluation of the mechanical and thermal tests and the same apparatus was used to obtain electric connector housing samples for evaluation of flexibility at connector hinge portions, appearance, and degree of release from the surface of the mould.

The solidification phenomena of PBT moulding compositions is schematically shown in FIG. 4 where the holding time of internal pressure (d) in a cavity is the dominant factor for obtaining increased flowability of the resin in a cavity.

In Example 1, the temperature at the cylinder head of the injection moulder was 260° C. and the mould was preheated to 45° C. The injection moulding conditions were as follows:

| | |
|---|---|
| injection pressure | 1.400 ~ 500 (Kgs/cm) |
| injection speed | medium rate |
| moulding cycle | 7 cycles/30 sec. |
| test piece A | moulded as the composition was fed. |
| test piece B | composition was homogeneously blended for five minutes in the cylinder of the injection apparatus before injection took place. |

Figure 1:
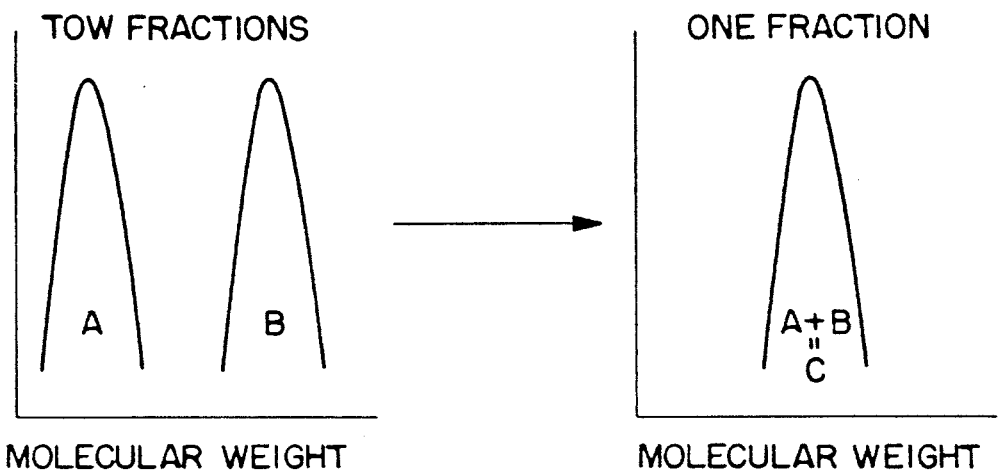
FIG. 1 shows molecular weight distributions of PBT(A) and PBT(B) having different molecular weight distribution to form one common molecular weight distribution of (A)+(B)=(C).
Figure 2L:
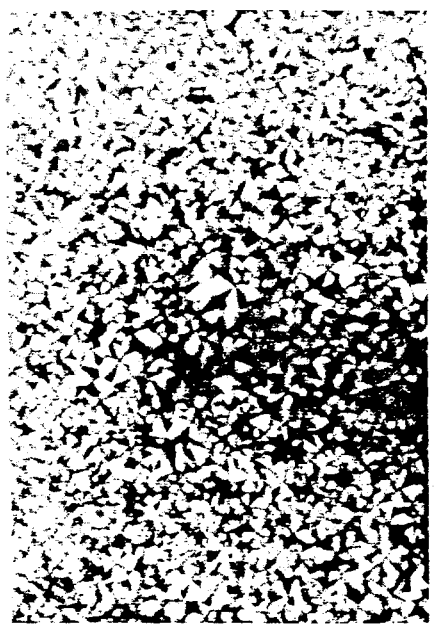
FIG. 2 shows differential scanning calorimetric analysis for PBT polymers.
Figure 2R:
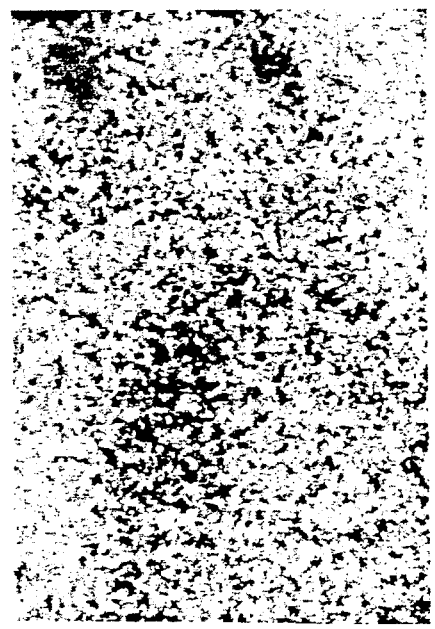
Figure 3:
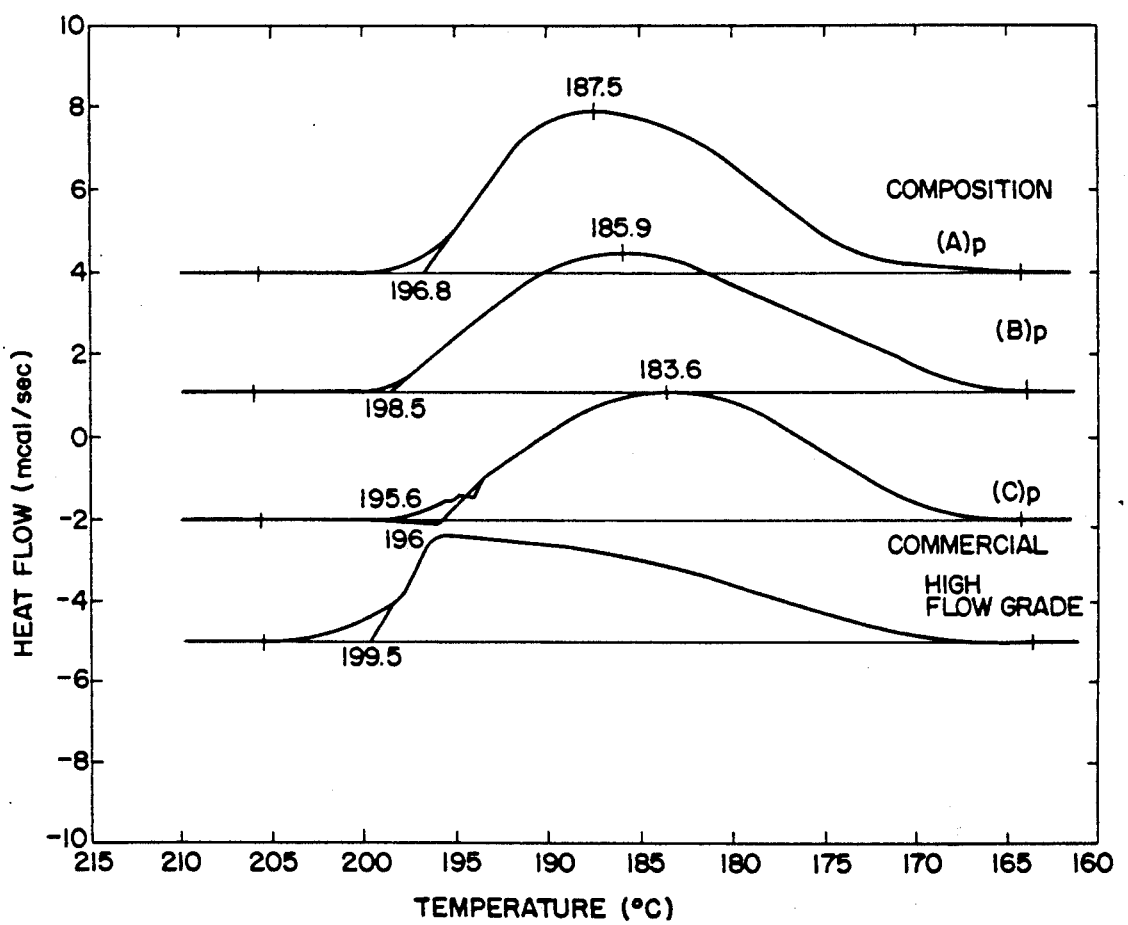
FIG. 3 shows crystalline structures of PBT polymer in mould test pieces.
Figure 4:
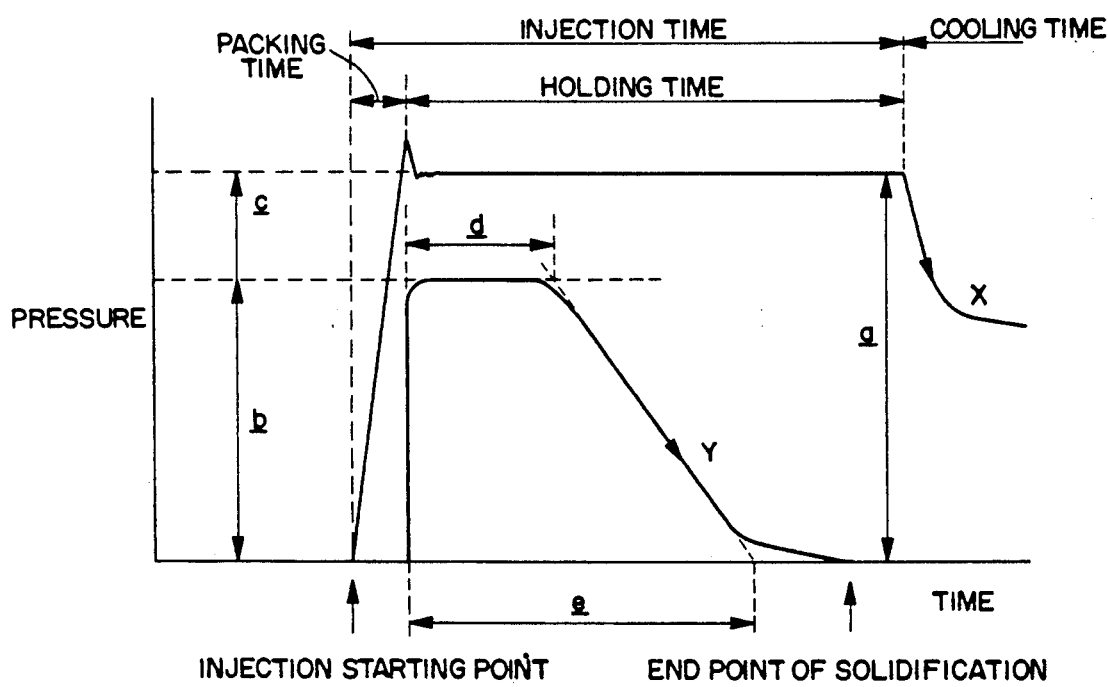
FIG. 4 illustrates steps of solidification of PBT polymer in a mould cavity.

Test pieces for characteritic measurements and a connector housing for a wiring harness assembly of autombiles were prepared by the steps of the conventional moulding process. Typical steps are shown in schematic diagram (FIG. 4). The results of the evaluation are listed in Tables 5 and 6 corresponding to the moulding compositions of the preceding examples.

The standards of the characteristic measurement are:

| Test Item | Standards |
|---|---|
| flexibility | ASTM D-790 |
| Izod impact strength | ASTM D-256 |
| MFR (Melt Flow Rate) | measured at 250° C. under 325 gs weight utilizing Melt-Indexer of Toyo Seiki Works. |

Elongation at low temperature was measured at three stages of thermal conditions using test pieces made from the PBT moulding composition of Example 1. The results of measurements were listed in Table 7 indicating marked improvement at low temperature.

TABLE 5

| Testing Item | Sample Status | Results of Evaluation Composition (Example) No. | | | | |
|---|---|---|---|---|---|---|
| | | Example 1 | Example 2 | Example 3 | Example 4 | Example 5 |
| flexibility | A | 867 | 861 | 872 | 850 | 865 |
| (kgf/cm$^2$) | B | 871 | 859 | 846 | 815 | 835 |
| impact strength | A | 4.6 | 4.3 | 4.2 | 4.3 | 4.5 |
| (kgf/cm$^2$) | B | 2.6 | 2.3 | 2.5 | 2.2 | 2.7 |
| MFR | A | 5.6 | 14.5 | 12.5 | 5.9 | 5.8 |
| (g/10 mm) | B | 15.3 | 25.4 | 20.6 | 17.1 | 16.0 |
| | ratio (B/A) | 2.7 | 1.8 | 1.6 | 2.9 | 2.8 |
| appearance | — | good | good | good | good | good |

Notes:
(1) Composition No. is equal to the Example Number.
(2) Sample status
A: test piece prepared by the normal steps of the injection moulding.
B: test pieces prepared after 5 minutes of maturity in the cylinder of the moulding machine followed by injection moulding.
(3) Appearance was evaluated by visual inspection with close attention to the hinge portion of the moulded connector housing.

TABLE 6

| Testing Item | Sample Status | Results of Evaluation Composition (Example) | | | | |
|---|---|---|---|---|---|---|
| | | Example 6 | Example 7 | Example 8 | Example 9 | Example 10 |
| flexibility | A | 835 | 848 | 856 | 860 | 843 |
| (kgf/cm$^2$) | B | 762 | 778 | 806 | 823 | 746 |
| impact strength | A | 4.1 | 4.2 | 4.8 | 4.4 | 4.1 |
| (kgf/cm$^2$) | B | 1.2 | 1.5 | 2.6 | 2.5 | 1.0 |
| MFR | A | 21.5 | 5.3 | 2.5 | 5.7 | 5.3 |
| (g/10 mm) | B | 69.8 | 24.1 | 9.8 | 15.4 | 23.7 |
| | Ratio (B/A) | 3.2 | 4.5 | 3.9 | 2.7 | 4.5 |
| appearance | — | good | good | good | deformed | good |

Notes:
(1) Composition No. is equal to the Example Number.
(2) Sample status:
A: test piece prepared by the normal steps of injection moulding.
B: test pieces prepared after 5 minutes of maturity in the cylinder of moulding machine followed by injection moulding.
(3) Appearance was evaluated by visual inspection with close attention to the hinge portion of the moulded connector housing.

TABLE 7

| | Elongation (%) composition | |
|---|---|---|
| temperature | Example 1 | Commercial Grade (High-Flow Grade) |
| 23° C. | 530 | 460 |
| 0° C. | 110 | 87 |
| −20° C. | 46 | 35 |

Improvement of low temperature property.

Various modifications of the compositions of the invention may be made without departing from the spirit or scope thereof and it is to be understood that the invention is intended to be limited only as defined in the appended claims.

What we claim is:

1. A polybutylene terephthalate molding composition consisting essentially of at least two polybutylene terephthalate resins of substantially different molar distributions expressed by their intrinsic viscosity, release agent for molded products out of a metal mold, a heat stabilizer and optionally a filler, said polybutylene terephthalate resins being a polymer A and a polymer B having an intrinsic viscosity value [ηα] and [ηβ] respectively defined as $0.70 < [\eta\alpha] < 0.92$ and $0.93 < [\eta\beta] < 1.40$ in (dl/gr) units when measured at 30° C. in a mixture of tetrachlorethane 60 and phenol 40 parts by weight.

2. A polybutylene terephthalate composition of claim 1 wherein the composition contains 5 to 95 parts by weight of polybutylene terephthalate resin A.

3. A polybutylene terephthalate composition of claim 1 wherein the moulded product has a spherulite crystalline structure of about three (3) micrometers to ten (10) micrometers in size.

4. A polybutylene terephthalate composition of claim 1 wherein the time for crystallization is about one third of the induction time for development of embryonic crystalline.

5. A polybutylene terephthalate composition of claim 1 wherein the weight ratio of the average molecular weight Mw and the number average molecular weight Mn is about two (2) after the polybutylene terephthalate resins are brought into the molten stage and are homogeneously blended together.

6. A polybutylene terephthalate composition of claim 1 wherein the release agent is selected from the group consisting of montan acid, montan wax salts and partially esterified montan wax ester salts.

7. A polybutylene terephthalate composition of claim 6 wherein the metal is selected from groups I, II, and III in the periodic Table.

8. A polybutylene terephthalate composition of claim 1 wherein the release agent is about 0.3 parts by weight of the total composition.

9. An electrical connector housing of claim 1 wherein the composition contains 5 to 95 parts by weight of polybutylene terephthalate resin A.

10. An electrical connector housing of claim 1 wherein spherulite crystallines in the housing are three (3) micrometers to ten (10) micrometers in size.

11. An electrical connector housing made by molding the polybutylene terephthalate molding composition of claim 1.

* * * * *